(12) United States Patent
Ozaki et al.

(10) Patent No.: US 12,169,347 B2
(45) Date of Patent: Dec. 17, 2024

(54) SEMICONDUCTOR MACH-ZEHNDER OPTICAL MODULATOR AND IQ MODULATOR

(71) Applicant: Nippon Telegraph and Telephone Corporation, Tokyo (JP)

(72) Inventors: Josuke Ozaki, Tokyo (JP); Yoshihiro Ogiso, Tokyo (JP); Yasuaki Hashizume, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 312 days.

(21) Appl. No.: 17/641,022

(22) PCT Filed: Sep. 12, 2019

(86) PCT No.: PCT/JP2019/035886
§ 371 (c)(1),
(2) Date: Mar. 7, 2022

(87) PCT Pub. No.: WO2021/048972
PCT Pub. Date: Mar. 18, 2021

(65) Prior Publication Data
US 2022/0326587 A1    Oct. 13, 2022

(51) Int. Cl.
*G02F 1/225*    (2006.01)
*G02F 1/21*    (2006.01)
*H04B 10/516*    (2013.01)

(52) U.S. Cl.
CPC ............ *G02F 1/2257* (2013.01); *G02F 1/212* (2021.01); *G02F 2202/102* (2013.01); *H04B 10/516* (2013.01)

(58) Field of Classification Search
CPC .. G02F 1/2257; G02F 1/212; G02F 2202/102; H04B 10/516
See application file for complete search history.

(56) References Cited

U.S. PATENT DOCUMENTS 5,394,490 A * 2/1995 Kato ................. G02B 6/43
                                                    327/237
5,621,837 A * 4/1997 Yamada ............. G02B 6/4232
                                                    385/88

(Continued)

FOREIGN PATENT DOCUMENTS

EP    2615489 A1    7/2013
EP    2615489 B1 *  9/2017    ........... G02F 1/0121

(Continued)

OTHER PUBLICATIONS

English Language translation of JP-414798-B2 (Year: 2008).*

(Continued)

*Primary Examiner* — Peter Radkowski
(74) *Attorney, Agent, or Firm* — Slater Matsil, LLP

(57) ABSTRACT

A semiconductor Mach-Zehnder optical modulator includes input-side lead-out lines, phase modulation electrode lines, and electrodes that apply modulation signals propagating through the phase modulation electrode lines to waveguides, respectively. The semiconductor Mach-Zehnder optical modulator further includes a conductive layer between a substrate and the waveguides, a plurality of first wiring layers connected to the conductive layer, and a second wiring layer that connects an electrode pad and the plurality of first wiring layers.

9 Claims, 11 Drawing Sheets

(56) References Cited

U.S. PATENT DOCUMENTS

| | | | | |
|---|---|---|---|---|
| 6,027,254 A * | 2/2000 | Yamada | G02B 6/4224 | 385/132 |
| 6,647,158 B2 * | 11/2003 | Betts | G02F 1/2257 | 385/2 |
| 6,862,124 B2 * | 3/2005 | Akiyama | G02F 1/2257 | 385/2 |
| 6,999,652 B2 * | 2/2006 | Mino | G02F 1/3136 | 385/16 |
| 7,082,244 B2 * | 7/2006 | Kawamonzen | C08G 73/1085 | 385/129 |
| 7,092,608 B2 * | 8/2006 | Kawamonzen | G02B 6/1221 | 385/129 |
| 7,116,859 B2 * | 10/2006 | Mino | H04Q 11/0005 | 385/16 |
| 7,177,495 B2 * | 2/2007 | Mino | G02F 1/31 | 385/17 |
| 7,206,473 B2 * | 4/2007 | Mino | H04Q 11/0005 | 385/17 |
| 7,536,066 B2 * | 5/2009 | Kato | G02B 6/43 | 385/14 |
| 7,657,131 B2 * | 2/2010 | Liu | G02F 1/2257 | 385/9 |
| 7,974,502 B2 * | 7/2011 | Mino | G02F 1/3136 | 359/288 |
| 7,994,549 B2 * | 8/2011 | Kim | G02F 1/025 | 359/279 |
| 8,300,992 B2 * | 10/2012 | Murata | G02F 1/225 | 385/2 |
| 8,412,005 B2 * | 4/2013 | Hashimoto | G02F 1/2257 | 385/132 |
| 8,467,637 B2 * | 6/2013 | Fujikata | H01L 31/022408 | 257/471 |
| 8,737,773 B2 * | 5/2014 | Motoya | G02F 1/2255 | 385/2 |
| 8,750,650 B2 * | 6/2014 | Shin | G02F 1/01708 | 385/129 |
| 9,231,728 B2 * | 1/2016 | Sugiyama | H04J 14/06 | |
| 9,335,568 B1 * | 5/2016 | Yap | G02F 1/065 | |
| 9,523,871 B2 * | 12/2016 | Kitamura | G02F 1/218 | |
| 9,638,980 B2 * | 5/2017 | Yagi | G02F 1/025 | |
| 9,671,670 B2 * | 6/2017 | Hollis | G02B 6/14 | |
| 9,939,709 B2 * | 4/2018 | Iwatsuka | G02B 6/122 | |
| 10,018,888 B2 * | 7/2018 | Thaniyavarn | G02F 1/2255 | |
| 10,025,159 B2 * | 7/2018 | Fujikata | G02F 1/0121 | |
| 10,168,596 B2 * | 1/2019 | Williams | G02F 1/2257 | |
| 10,247,998 B2 * | 4/2019 | Velthaus | G02F 1/2255 | |
| 10,248,000 B2 * | 4/2019 | Kitamura | H01L 24/48 | |
| 10,254,624 B2 * | 4/2019 | Ogiso | G02F 1/225 | |
| 10,317,709 B2 * | 6/2019 | Tsuzuki | G02F 1/025 | |
| 10,409,093 B2 * | 9/2019 | Nejadmalayeri | G02F 1/0121 | |
| 10,527,874 B2 * | 1/2020 | Miyazaki | G02F 1/03 | |
| 10,534,204 B2 * | 1/2020 | Horst | G02F 1/017 | |
| 10,705,354 B2 * | 7/2020 | Menezo | G02F 1/025 | |
| 10,749,601 B2 * | 8/2020 | Urino | H04B 10/676 | |
| 10,888,875 B2 * | 1/2021 | Oh | G01N 27/44756 | |
| 10,890,787 B2 * | 1/2021 | Kawamura | G02F 1/2255 | |
| 10,996,537 B2 * | 5/2021 | Davies | G02F 1/0123 | |
| 11,009,659 B2 * | 5/2021 | Ward | G02B 6/125 | |
| 11,175,520 B2 * | 11/2021 | Horiguchi | B29D 11/00673 | |
| 11,567,353 B2 * | 1/2023 | Kharel | G02F 1/0356 | |
| 2002/0071622 A1 * | 6/2002 | Betts | G02F 1/2257 | 385/2 |
| 2003/0138179 A1 * | 7/2003 | Akiyama | G02F 1/2257 | 385/2 |
| 2004/0086220 A1 * | 5/2004 | Mino | G02F 1/3132 | 385/22 |
| 2004/0197064 A1 * | 10/2004 | Kawamonzen | G02B 6/4246 | 385/129 |
| 2006/0034563 A1 * | 2/2006 | Mino | H04Q 11/0005 | 385/16 |
| 2006/0034565 A1 * | 2/2006 | Mino | H04Q 11/0005 | 385/16 |
| 2006/0159413 A1 * | 7/2006 | Kawamonzen | C08G 73/1085 | 385/147 |
| 2006/0210215 A1 * | 9/2006 | Aoki | H04B 10/40 | 385/14 |
| 2007/0154137 A1 * | 7/2007 | Mino | G02F 1/31 | 385/16 |
| 2008/0118202 A1 * | 5/2008 | Kato | G02B 6/12004 | 385/14 |
| 2009/0003755 A1 * | 1/2009 | Liu | G02F 1/2257 | 385/3 |
| 2009/0237770 A1 * | 9/2009 | Kim | G02F 1/025 | 359/279 |
| 2010/0119192 A1 * | 5/2010 | Fujikata | G02B 6/4204 | 257/E31.127 |
| 2010/0296766 A1 * | 11/2010 | Ishibashi | G02F 1/017 | 385/2 |
| 2011/0069924 A1 * | 3/2011 | Murata | G02F 1/225 | 385/2 |
| 2011/0235961 A1 * | 9/2011 | Hashimoto | G02F 1/2257 | 385/3 |
| 2012/0070111 A1 * | 3/2012 | Shin | G02F 1/2257 | 385/2 |
| 2012/0230627 A1 * | 9/2012 | Motoya | G02F 1/2255 | 385/3 |
| 2013/0209023 A1 * | 8/2013 | Prosyk | G02F 1/011 | 385/3 |
| 2014/0199014 A1 * | 7/2014 | Velthaus | G02F 1/2255 | 438/31 |
| 2014/0205229 A1 * | 7/2014 | Thaniyavarn | G02F 1/225 | 385/3 |
| 2014/0254998 A1 * | 9/2014 | Furuya | G02B 6/1228 | 438/69 |
| 2015/0043867 A1 * | 2/2015 | Kono | G02F 1/025 | 438/31 |
| 2015/0063809 A1 * | 3/2015 | Sugiyama | G02F 1/2255 | 385/2 |
| 2015/0063825 A1 * | 3/2015 | Yamase | H04L 27/20 | 398/154 |
| 2015/0277207 A1 * | 10/2015 | Fujikata | G02F 1/0121 | 385/3 |
| 2015/0280828 A1 * | 10/2015 | Urino | H04B 10/676 | 398/25 |
| 2015/0286108 A1 * | 10/2015 | Prosyk | G02F 1/225 | 385/3 |
| 2016/0011439 A1 * | 1/2016 | Kitamura | G02F 1/218 | 438/31 |
| 2016/0026063 A1 * | 1/2016 | Yagi | G02F 1/2255 | 216/17 |
| 2016/0202592 A1 * | 7/2016 | Hollis | G02F 1/2255 | 385/2 |
| 2016/0291350 A1 * | 10/2016 | Fujikata | G02F 1/025 | |
| 2016/0291352 A1 * | 10/2016 | Kissa | G02F 1/0316 | |
| 2017/0052424 A1 * | 2/2017 | Iwatsuka | G02B 6/122 | |
| 2018/0164654 A1 * | 6/2018 | Ogiso | G02F 1/2257 | |
| 2018/0239176 A1 * | 8/2018 | Tsuzuki | G02F 1/025 | |
| 2018/0275482 A1 * | 9/2018 | Kitamura | G02F 1/025 | |
| 2018/0329269 A1 * | 11/2018 | Ward | G02F 1/2255 | |
| 2018/0341164 A1 * | 11/2018 | Williams | G02F 1/2257 | |
| 2018/0361400 A1 * | 12/2018 | Oh | G01N 33/48721 | |
| 2019/0018262 A1 * | 1/2019 | Nejadmalayeri | G02F 1/01 | |
| 2019/0025615 A1 * | 1/2019 | Kawamura | G02F 1/025 | |
| 2019/0113778 A1 * | 4/2019 | Miyazaki | G02F 1/025 | |
| 2019/0243167 A1 * | 8/2019 | Menezo | G02F 1/025 | |
| 2021/0157177 A1 * | 5/2021 | Kharel | G02F 1/0316 | |

FOREIGN PATENT DOCUMENTS

| | | | | |
|---|---|---|---|---|
| JP | 2006262476 A * | 9/2006 | | H04B 10/40 |
| JP | 4141798 B2 * | 8/2008 | | G02F 1/2257 |
| JP | 2009048021 A * | 3/2009 | | |
| JP | 2019045666 A * | 3/2019 | | |

OTHER PUBLICATIONS

Hoffmann et al., "45 GHZ Bandwidth Travelling Wave Electrode Mach-Zehnder Modulator With Integrated Spot Size Converter",

(56) References Cited

OTHER PUBLICATIONS

2004 International Conference on Indium Phoshide and Related Materials, Conference Proceedings, 16th IPRM, Kagoshima, Japan, May 31-Jun. 4, 2004, pp. 585-588.

Klein et al., "1.55 μm Mach-Zehnder Modulators on InP for optical 40/80 Gbit/s transmission networks", 2006 International Conference on Indium Phosphide and Related Materials Conference Proceedings, Princeton, NJ, USA, May 8-11, 2006, pp. 171-173.

Ozaki et al., "Ultra-low Power Dissipation (<2.4 W) Coherent InP Modulator Module with CMOS Driver IC", 2018 European Conference on Optical Communication (ECOC), Rome, Italy, Sep. 23-27, 2018, 3 pages.

* cited by examiner

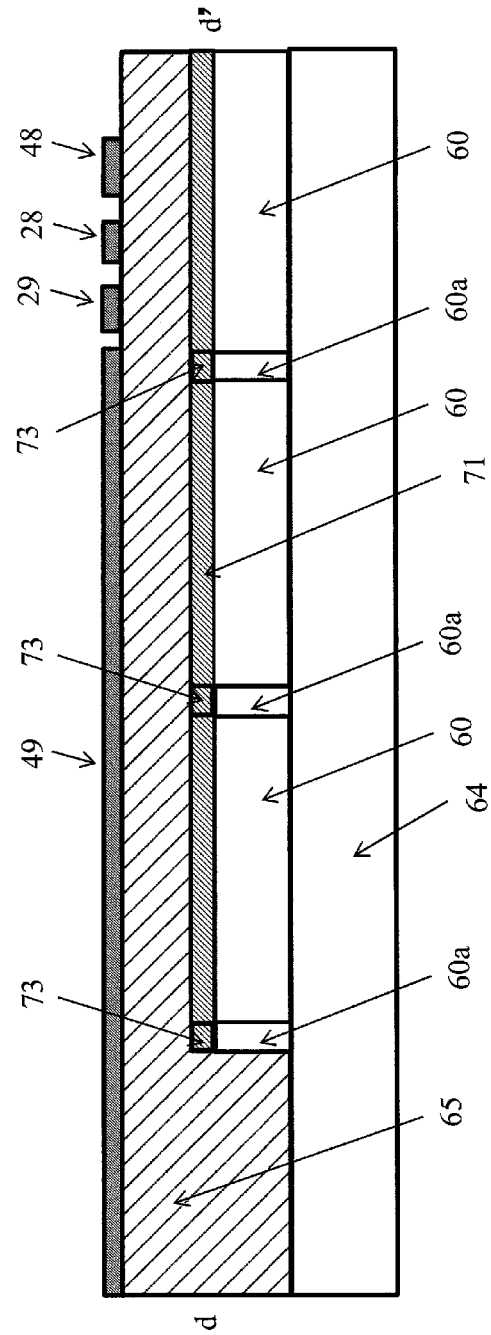

SEMICONDUCTOR MACH-ZEHNDER OPTICAL MODULATOR AND IQ MODULATOR

CROSS-REFERENCE TO RELATED APPLICATIONS

This application is a national phase entry of PCT Application No. PCT/JP2019/035886, filed on Sep. 12, 2019, which application is hereby incorporated herein by reference.

TECHNICAL FIELD

The present invention relates to a semiconductor Mach-Zehnder modulator that modulates an optical signal with an electric signal, and an IQ modulator in which semiconductor Mach-Zehnder modulators are used.

BACKGROUND

In order to meet an increasing demand for communication traffic, a high-speed optical modulator adaptable to a high-level optical modulation method is demanded. In particular, high-order optical modulators through use of the digital coherent technology play a great role in achieving transceivers having a large capacity exceeding 100 Gbps. In these high-order optical modulators, MZ (Mach-Zehnder) interference optical modulators capable of zero chirp driving are included in parallel and in multiple stages so as to add independent signals to the amplitude and phase of light, respectively.

Recent challenges are size reduction of an optical transmitter module and reduction of a driving voltage, and research and development of a compact semiconductor MZ modulator that enables reduction of the driving voltage is being advanced enthusiastically. Furthermore, in the research and development of the semiconductor MZ modulator, the movement toward adaptation to a higher baud rate such as 64 GBaud or 100 GBaud is being accelerated, and there is a need for the modulator to adapt to a wider band.

Meanwhile, research and development of a HB-CDM (High Bandwidth Coherent Driver Modulator) intended not only to improve characteristics with a modulator alone, but also to improve radio frequency characteristics and achieve size reduction by integrating a driver and a modulator into a single package and offering a coordinated design of the driver and the modulator is being accelerated (see Non-Patent Literature 1). Since the differentially-driven driver and the modulator are integrated in the configuration of HB-CDM, it is desirable that the modulator itself have a differentially-driven configuration.

In a wideband semiconductor MZ modulator, a traveling wave electrode is commonly used. In order to improve the modulation band in the traveling wave electrode, (I) light speed matching between microwaves propagating through the electrode and light propagating through a waveguide, and (II) reduction of a propagation loss in the electrode are very important. In order to meet (I) and (II), a capacitively loaded structure is used in the semiconductor MZ modulator (see Non-Patent Literature 2 and Non-Patent Literature 3).

The semiconductor MZ modulator having the capacitively loaded structure is designed such that a main line for transmitting a modulation signal and electrodes for separating the modulation signal from the main line for application to waveguides are formed to perform phase modulation. By optimally designing the number of and interval between electrodes branched from this main line as well as the length of contact of the electrodes with the waveguides, the amount of capacity to be added to the main line can be designed freely, and the impedance of the main line and the speed of microwaves can be designed to have arbitrary values. In addition, by designing an optimum amount of capacity to be added to the main line, speed matching between optical waves and microwaves can be improved, and impedance matching to 50Ω can be achieved, as a result of which adaptation to a wider band can be achieved.

In addition, the semiconductor MZ modulator having the capacitively loaded structure is configured such that a voltage is applied between an underlying n-type semiconductor layer and a surface electrode, and because of their voltage difference, a reverse bias is applied to a semiconductor MQW (Multi Quantum Well) layer, and a modulation operation is performed. The n-type semiconductor layer is significantly lower in resistance value than a p-type semiconductor layer, but is higher in resistance value than metal. Since in the capacitively loaded structure, the voltage needs to be applied through the n-type semiconductor layer, a voltage drop is caused by the resistance of the n-type semiconductor layer in a case in which a current flows into the n-type semiconductor layer. When a voltage drop occurs, an absolute amount of a necessary voltage to be applied to the n-type semiconductor layer for driving increases, which increases a bias voltage during operation, resulting in a problem of poor efficiency.

A specific description will be provided using FIG. 10A and FIG. 10B. FIG. 10A is a plan view of a semiconductor MZ optical modulator, and FIG. 10B is a cross-sectional view taken along the line c-c' in FIG. 10A. In FIG. 10A and FIG. 10B, an input waveguide of the semiconductor MZ optical modulator is denoted by 101, an output waveguide is denoted by 102, an optical branching filter that separates optical waves propagating through the input waveguide 101 into two waveguides 104, 105 is denoted by 103, an optical multiplexer that multiplexes optical waves propagating through the two waveguides 104, 105 into the output waveguide 102 is denoted by 106, coplanar strip lines are denoted by 109, 110, electrodes for applying a voltage to the waveguides 104, 105 are denoted by 111, 112, and an electrode pad connected to the underlying n-type semiconductor layer is denoted by 118.

In FIG. 10B, an n-InP layer (n-type semiconductor layer) is denoted by 113, a lower cladding layer made of InP is denoted by 114, a semiconductor core layer through which optical waves propagate is denoted by 115, an upper cladding layer made of InP is denoted by 116, and an SI-InP substrate is denoted by 117.

The input waveguide 101, the output waveguide 102, the optical branching filter 103, the waveguides 104, 105, and the optical multiplexer 106 constitute a MZ interferometer. In the MZ interferometer, by applying a voltage to the waveguides 104, 105, the refractive index is changed in the semiconductor core layer 115 by virtue of an electro-optic effect. As a result, the phase of light is changed. At this time, by providing a voltage difference between the waveguides 104, 105, an optical interference state in the optical multiplexer 106 is changed, so that light can be modulated (that is, output light of the output waveguide 102 is turned on and off).

An SG configuration is presented in which, in a case in which one of the two coplanar strip lines 109, 110 is connected to an input electric signal (S), the other is connected to a reference potential or a ground (G).

Microwaves propagating through the coplanar strip lines 109, no are applied to the waveguides 104, 105 by the electrodes 111, 112. The electrodes 111, 112 and the coplanar strip lines 109, no form a traveling wave electrode as a whole. That is, an electrode structure intended to increase the modulation band by matching the speed of optical waves propagating through the waveguides 104, 105 and the speed of microwaves propagating through the above-described traveling wave electrode as close as possible to achieve phase matching between the optical waves and the microwaves is presented. If there is no loss in microwaves, and speed matching conditions between the optical waves and the microwaves are satisfied completely, the modulation band will be infinite. However, reflection of microwaves due to a loss in microwaves or impedance mismatching and a phase shift between the optical waves and the microwaves actually occur, and thus the modulation band is restricted for these reasons.

Since the upper cladding layer 116, the semiconductor core layer 115, and the lower cladding layer 114 are present under the electrodes 111, 112 as described earlier, certain element capacity is present. That is, in FIG. 10A, the electrodes 111, 112 add capacity to the coplanar strip lines 109, 110. In other words, by optimally designing the number of and interval between the electrodes 111, 112 as well as the length of contact of the electrodes 111, 112 with the waveguides 104, 105, the amount of capacity to be added to the coplanar strip lines 109, no can be freely designed, and the impedance of the coplanar strip lines 109, no and the speed of microwaves can be designed to have arbitrary values.

In addition, two electrode pads 118 connected to the n-InP layer 113 (n-type semiconductor layer) for driving the modulator are placed at portions away from the coplanar strip lines 109,110 and the electrodes 111, 112. These two electrode pads 118 are arranged at the same position in an extended direction of the waveguides 101, 102, 104, and 105. As described above, a voltage is applied to the n-type semiconductor layer through the electrode pads 118 in the semiconductor MZ modulator having the capacitively loaded structure, however, a voltage drop is caused by the resistance of the n-type semiconductor layer, which raises a problem of poor power efficiency.

CITATION LIST

Non-Patent Literature

Non-Patent Literature 1: J. Ozaki, et al., "Ultra-low Power Dissipation (<2.4 W) Coherent InP Modulator Module with CMOS Driver IC", Mo3C.2, ECOC, 2018
Non-Patent Literature 2: H. N. Klein et al., "1.55 µm Mach-Zehnder Modulators on InP for optical 40/80 Gbit/s transmission networks", OFC2006, pp. 171-173, 2006
Non-Patent Literature 3: D. Hoffman et al., "45 GHz bandwidth travelling wave electrode Mach-Zehnder modulator with integrated spot size converter", IPRM 2004

SUMMARY

Technical Problem

An object of the present invention, which has been made to solve the above-described problems, is to prevent a voltage drop that would occur in a case in which a bias voltage for operation is applied to an underlying conductive layer in a semiconductor Mach-Zehnder optical modulator having the capacitively loaded structure.

Means for Solving the Problem

A semiconductor Mach-Zehnder optical modulator according to an embodiment of the present invention includes: an optical waveguide formed on a semi-insulating semiconductor substrate; an input-side lead-out line formed on a dielectric layer of at least one layer on the substrate, a modulation signal being input to one end of the input-side lead-out line; a phase modulation electrode line formed on the dielectric layer along the optical waveguide, and having one end connected to the other end of the input-side lead-out line; an electrode that applies the modulation signal propagating through the phase modulation electrode line to the optical waveguide; a conductive layer formed between the substrate and the optical waveguide; a plurality of first wiring layers formed intermittently in an extended direction of the optical waveguide so as to cross the optical waveguide, and connected to the conductive layer; and a second wiring layer formed to connect an electrode pad for applying a voltage to the conductive layer and the plurality of first wiring layers.

In addition, in a configuration example of the semiconductor Mach-Zehnder optical modulator according to an embodiment of the present invention, the first wiring layers are made of any of an n-type semiconductor layer, metal, and a structure in which metal is formed on an n-type semiconductor layer, and the second wiring layer is made of metal. In addition, in a configuration example of the semiconductor Mach-Zehnder optical modulator according to an embodiment of the present invention, the first and second wiring layers are formed closer to the substrate than to the input-side lead-out line and the phase modulation electrode line, respectively. In addition, in a configuration example of the semiconductor Mach-Zehnder optical modulator according to an embodiment of the present invention, a plurality of the electrodes are provided periodically in the extended direction of the optical waveguide, and a first wiring layer of the plurality of first wiring layers that is formed in a region of the phase modulation electrode line is arranged at a central position between two electrodes adjacent to each other in the extended direction of the optical waveguide.

In addition, a configuration example of the semiconductor Mach-Zehnder optical modulator according to an embodiment of the present invention further includes an output-side lead-out line formed on the dielectric layer, and having one end connected to the other end of the phase modulation electrode line, in which the optical waveguide includes two first and second arm waveguides, the input-side lead-out line includes a first input-side lead-out line, a modulation signal being input to one end of the first input-side lead-out line, and a second input-side lead-out line formed on the dielectric layer adjacent to the first input-side lead-out line, a signal complementary to the modulation signal being input to one end of the second input-side lead-out line, the phase modulation electrode line includes two first and second phase modulation electrode lines formed on the dielectric layer along the first and second arm waveguides, and having one ends respectively connected to the other ends of the first and second input-side lead-out lines, the output-side lead-out line includes two first and second output-side lead-out lines having one ends respectively connected to the other ends of the first and second phase modulation electrode lines, and the electrode includes two first and second electrodes that respectively apply modulation signals propagating through the first and second phase modulation electrode lines to the first and second arm waveguides. The semiconductor Mach-Zehnder optical modulator further includes: a first ground line formed in the extended direction of the optical waveguide on the dielectric layer outside the first input-side lead-out line, the first phase modulation electrode line, and the first output-side lead-out line; and a second ground line formed in the extended direction of the optical waveguide on the dielectric layer outside the second input-side lead-out line, the second phase modulation electrode line, and the second output-side lead-out line.

In addition, an IQ modulator according to an embodiment of the present invention includes: two semiconductor Mach-Zehnder optical modulators; an input waveguide formed on the substrate; and a branching filter formed on the substrate to separate light propagating through the input waveguide into two systems for input to the two semiconductor Mach-Zehnder optical modulators, in which, of the two semiconductor Mach-Zehnder optical modulators, a first semiconductor Mach-Zehnder optical modulator that receives an I modulation signal as an input and a second semiconductor Mach-Zehnder optical modulator that receives a Q modulation signal as an input are arranged such that their optical waveguides are located in parallel to each other, the second ground line of the first semiconductor Mach-Zehnder optical modulator and the first ground line of the second semiconductor Mach-Zehnder optical modulator adjacent to the second ground line are formed integrally as a ground line common to the two semiconductor Mach-Zehnder optical modulators, and in the second wiring layer, a portion arranged in the extended direction of the optical waveguide is arranged under a centerline of the common ground line. In addition, a configuration example of the IQ modulator according to an embodiment of the present invention is connected from a single electrode pad to the first wiring layers of each of the first and second semiconductor Mach-Zehnder optical modulators through the second wiring layer. In addition, in a configuration example of the IQ modulator according to an embodiment of the present invention, the plurality of wiring layers are each formed from a position under the first ground line of the first semiconductor Mach-Zehnder optical modulator to a position under the second ground line of the second semiconductor Mach-Zehnder optical modulator, and a distance from the second wiring layer to an end close to the first semiconductor Mach-Zehnder optical modulator and a distance from the second wiring layer to an end close to the second semiconductor Mach-Zehnder optical modulator are equal.

Effects of the Invention

According to embodiments of the present invention, by providing the plurality of first wiring layers formed intermittently in the extended direction of the optical waveguide, and connected to the conductive layer, and the second wiring layer formed to connect the electrode pad and the plurality of first wiring layers, a voltage drop that would be caused by the resistance of the conductive layer such as an n-type semiconductor layer when driving a capacitively loaded semiconductor Mach-Zehnder optical modulator can be prevented without deteriorating RF characteristics. As a result, embodiments of the present invention can provide an excellent differential capacitively loaded semiconductor Mach-Zehnder optical modulator driven at a low bias voltage and capable of a high baud rate operation.

BRIEF DESCRIPTION OF THE DRAWINGS

FIG. 9 is a cross-sectional view of a portion of a ground line of the IQ modulator according to the third embodiment of the present invention.

DETAILED DESCRIPTION OF ILLUSTRATIVE EMBODIMENTS

Principles of invention

In embodiments of the present invention, a plurality of wiring layers for applying a voltage to an underlying n-type semiconductor layer (conductive layer) are prepared in order to prevent an increase in bias voltage necessary for operating a capacitively loaded semiconductor MZ modulator. Furthermore, by providing connection wiring having a predetermined structure, an influence upon RF (Radio Frequency) characteristics due to the presence of the wiring layers is minimized.

First Embodiment

Figure 1:
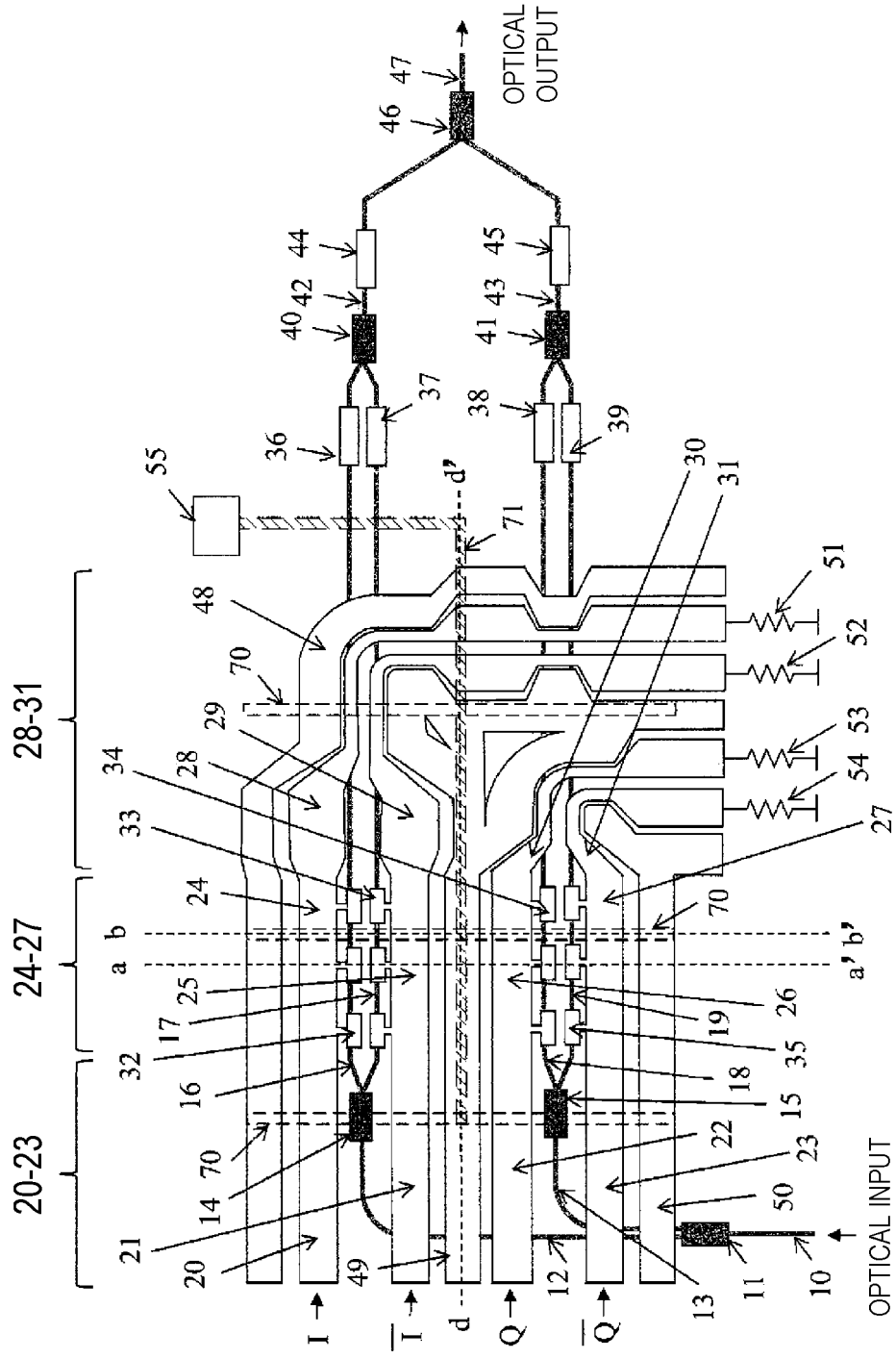
FIG. 1 is a plan view illustrating a configuration of an IQ modulator according to a first embodiment of the present invention.

Hereinafter, embodiments of the present invention will be described with reference to the drawings. FIG. 1 is a plan view illustrating a configuration of an IQ modulator according to a first embodiment of the present invention. FIG. 1 depicts a phase modulation portion of the IQ modulator composed of two semiconductor MZ modulators.

The IQ modulator includes an input waveguide 10, a 1×2 MMI coupler 11, waveguides 12, 13, a 1×2 MMI coupler 14, a 1×2 MMI coupler 15, waveguides 16, 17 (first and second arm waveguides), waveguides 18, 19 (first and second arm waveguides), input-side lead-out lines 20, 21 (first and second input-side lead-out lines), input-side lead-out lines 22, 23 (first and second input-side lead-out lines), phase modulation electrode lines 24, 25 (first and second phase modulation electrode lines), phase modulation electrode lines 26, 27 (first and second phase modulation electrode lines), output-side lead-out lines 28, 29 (first and second output-side lead-out lines), output-side lead-out lines 30, 31 (first and second output-side lead-out lines), electrodes 32, 33 (first and second electrodes), and electrodes 34, 35 (first and second electrodes). The aforementioned 1×2 MMI coupler 11 separates light propagating through the input waveguide 10 into two systems. The aforementioned waveguides 12, 13 guide the two rays of light separated by the 1×2 MMI coupler 11. The aforementioned 1×2 MMI coupler 14 separates light propagating through the waveguide 12 into two systems. The aforementioned 1×2 MMI coupler 15 separates light propagating through the waveguide 13 into two systems. The aforementioned waveguides 16, 17 guide the two rays of light separated by the 1×2 MMI coupler 14. The aforementioned waveguides 18, 19 guide the two rays of light separated by the 1×2 MMI coupler 15. The aforementioned input-side lead-out lines 20, 21 are made of a conductor for applying an I modulation signal to the waveguides 16, 17. The aforementioned input-side lead-out lines 22, 23 are made of a conductor for applying a Q modulation signal to the waveguides 18, 19. The aforementioned phase modulation electrode lines 24, 25 are made of a conductor connected to the input-side lead-out lines 20, 21. The aforementioned phase modulation electrode lines 26, 27 are made of a conductor connected to the input-side lead-out lines 22, 23. The aforementioned output-side lead-out lines 28, 29 are made of a conductor connected to the phase modulation electrode lines 24, 25. The aforementioned output-side lead-out lines 30, 31 are made of a conductor connected to the phase modulation electrode lines 26, 27. The aforementioned electrodes 32, 33 are made of a conductor for applying an I modulation signal supplied from the phase modulation electrode lines 24, 25 to the waveguides 16, 17. The aforementioned electrodes 34, 35 are made of a conductor for applying a Q modulation signal supplied from the phase modulation electrode lines 26, 27 to the waveguides 18, 19.

Furthermore, the dual-polarization IQ modulator includes phase adjustment electrodes 36 to 39, a 2×1 MMI coupler 40, a 2×1 MMI coupler 41, a waveguide 42, a waveguide 43, phase adjustment electrodes 44, 45, a 2×1 MMI coupler 46, an output waveguide 47, a ground line 48, a ground line 49, a ground line 50, termination resistors 51 to 54, and an electrode pad 55. The aforementioned phase adjustment electrodes 36 to 39 are made of a conductor for adjusting the phase of modulated signal light propagating through the waveguides 16 to 19. The aforementioned 2×1 MMI coupler 40 multiplexes signal light in the two systems propagating through the waveguides 16, 17. The aforementioned 2×1 MMI coupler 41 multiplexes signal light in the two systems propagating through the waveguides 18, 19. The aforementioned waveguide 42 guides output light of the 2×1 MMI coupler 40. The aforementioned waveguide 43 guides output light of the 2×1 MMI coupler 41. The aforementioned phase adjustment electrodes 44, 45 are made of a conductor for adjusting the phase of signal light propagating through the waveguides 42, 43. The aforementioned 2×1 MMI coupler 46 multiplexes signal light in the two systems propagating through the waveguides 42, 43. The aforementioned ground line 48 is made of a conductor provided outside the 2×1 MMI coupler 46, the output waveguide 47, the input-side lead-out line 20, the phase modulation electrode line 24, and the output-side lead-out line 28. The aforementioned ground line 49 is made of a conductor provided between the input-side lead-out line 21, the phase modulation electrode line 25, and the output-side lead-out line 29, and the input-side lead-out line 22, the phase modulation electrode line 26, and the output-side lead-out line 30. The aforementioned ground line 50 is made of a conductor provided outside the input-side lead-out line 23, the phase modulation electrode line 27, and the output-side lead-out line 31. The aforementioned termination resistors 51 to 54 are connected to ends of the output-side lead-out lines 28 to 31. The aforementioned electrode pad 55 applies a voltage to the underlying n-type semiconductor layer.

A radio frequency line of the IQ modulator of the present embodiment is formed from three portions: the portion of the input-side lead-out lines 20 to 23; the portion of the phase modulation electrode lines 24 to 27; and the portion of the output-side lead-out lines 28 to 31, and in all the portions presents a differential line structure (GSSG (ground signal signal ground) configuration) in which impedance matching is achieved. If impedance matching is not achieved, signal reflection would occur at connections in the radio frequency line, causing the radio frequency characteristics to deteriorate.

In the present embodiment, the radio frequency line has the differential line configuration in all the portions, so that the modulator can be driven by a differential input signal (differential driver) having a high energy efficiency. In addition, in the present embodiment, the radio frequency line having the differential line configuration can achieve smooth radio frequency connection even with an open collector or open drain differential driver recently used from the perspective of reducing power consumption, and both low power consumption and broadband performance can be achieved.

Next, a radio frequency line pattern of the present embodiment will be described in more detail. As described above, the radio frequency line pattern of the present embodiment adopts, as a basic structure, a GSSG differential coplanar line composed of two signal lines and two ground lines formed on a dielectric layer made of a low-dielectric material.

However, in the present embodiment, the semiconductor MZ modulator that receives an I modulation signal as an input and the semiconductor MZ modulator that receives a Q modulation signal as an input are arranged on a substrate in parallel such that their waveguides are located in parallel to each other.

In the present embodiment, the radio frequency line pattern of the semiconductor MZ modulator on the I modulation signal side and the radio frequency line pattern of the semiconductor MZ modulator on the Q modulation signal side share the ground line 49 at the center. That is, a ground line of the semiconductor MZ modulator on the I modulation signal side and a ground line of the semiconductor MZ modulator on the Q modulation signal side adjacent thereto are formed integrally as a ground line common to these two semiconductor MZ optical modulators.

An I modulation signal is input to the input-side lead-out line 20 from a differential driver (not shown) formed on a SI-InP substrate which will be described later, and an I modulation signal (bar I) complementary thereto is input to the input-side lead-out line 21 from the differential driver. Similarly, a Q modulation signal is input to the input-side lead-out line 22 from the differential driver, and a Q modulation signal (bar Q) complementary thereto is input to the input-side lead-out line 23 from the differential driver.

The phase modulation electrode lines 24 to 27 are provided in parallel to the waveguides 16 to 19 constituting the semiconductor MZ modulator. The phase modulation electrode lines 24 to 27 and the electrodes 32 to 35 connected thereto form a differential capacitively loaded structure (GSSG configuration) excellent in impedance matching and speed matching between microwaves and optical waves.

That is, it is configured such that the ground line 48, the phase modulation electrode line 24 to which an I modulation signal is input, the electrode 32 to which the I modulation signal is supplied from the phase modulation electrode line 24, the electrode 33 to which a signal (bar I) complementary to the I modulation signal is input, the phase modulation electrode line 25 that supplies the signal to the electrode 33, the ground line 49, the phase modulation electrode line 26 to which a Q modulation signal is input, the electrode 34 to which the Q modulation signal is supplied from the phase modulation electrode line 26, the electrode 35 to which a signal (bar Q) complementary to the Q modulation signal is input, the phase modulation electrode line 27 that supplies the signal to the electrode 35, and the ground line 50 are aligned.

By optimally designing the number of, interval between, and length of the electrodes 32 to 35 of the capacitively loaded portion branched from the phase modulation electrode lines 24 to 27 which are main lines and formed periodically, the amount of capacity to be added to the phase modulation electrode lines 24 to 27 can be designed freely, so that impedances of the phase modulation electrode lines 24 to 27 and the speed of microwaves propagating through the phase modulation electrode lines 24 to 27 can be designed to have arbitrary values.

The input-side lead-out lines 20 to 23 may have the GSSG configuration, or may have a GSGSG configuration (a configuration obtained by further adding a ground line between the input-side lead-out lines 20 and 21 and a ground line between the input-side lead-out lines 22 and 23 to the GSSG configuration). In general, the differential capacitively loaded structure of the phase modulation portion has the GSSG configuration in many cases, and the present embodiment also adopts the GSSG configuration. Thus, the input-side lead-out lines 20 to 23 and the output-side lead-out lines 28 to 31 are also radio frequency lines of the GSSG configuration.

The reason why the input-side lead-out lines 20 to 23 and the output-side lead-out lines 28 to 31 have the GSSG configuration identical to the phase modulation portion is because of concerns about losses and deterioration in characteristics due to a mode change such as a change from the GSGSG configuration to the GSSG configuration or a change from the GSSG configuration to the GSGSG configuration. If the phase modulation portion has the GSGSG configuration, it is desirable that the input-side lead-out lines 20 to 23 and the output-side lead-out lines 28 to 31 have the GSGSG configuration.

The respective ends of the output-side lead-out lines 28 to 31 are terminated by the radio frequency termination resistors 51 to 54. Ends of the radio frequency termination resistors 51 to 54 that are not connected to the output-side lead-out lines 28 to 31 are grounded or set at an arbitrary potential. First ends of the ground lines 48 to 50 (on the left end in FIG. 1) are connected to the ground of the differential driver.

The 1×2 MMI coupler 14, the waveguides 16, 17, the input-side lead-out lines 20, 21, the phase modulation electrode lines 24, 25, the output-side lead-out lines 28, 29, the electrodes 32, 33, and the 2×1 MMI coupler 40 constitute an I-side semiconductor MZ modulator. This semiconductor MZ modulator modulates the phase of light propagating through the waveguides 16, 17 in accordance with the I modulation signal applied from the electrodes 32, 33 to the waveguides 16, 17.

Similarly, the 1×2 MMI coupler 15, the waveguides 18, 19, the input-side lead-out lines 22, 23, the phase modulation electrode lines 26, 27, the output-side lead-out lines 30, 31, the electrodes 34, 35, and the 2×1 MMI coupler 41 constitute an Q-side semiconductor MZ modulator. This semiconductor MZ modulator modulates the phase of light propagating through the waveguides 18, 19 in accordance with the Q modulation signal applied from the electrodes 34, 35 to the waveguides 18, 19.

The 2×1 MMI coupler 40 multiplexes modulated signal light propagating through the waveguides 16, 17, and the 2×1 MMI coupler 41 multiplexes modulated signal light propagating through the waveguides 18, 19. By applying a voltage to the phase adjustment electrodes 44, 45, the phase can be adjusted such that a phase difference between the I-side signal light output from the 2×1 MMI coupler 40 and the Q-side signal light output from the 2×1 MMI coupler 41 is 90 degrees.

The 2×1 MMI coupler 46 multiplexes the I-side signal light propagating through the waveguide 42 and the Q-side signal light propagating through the waveguide 43 to obtain an optical IQ modulation signal. In the present embodiment, the IQ modulator can thus be achieved.

Since the semiconductor MZ optical modulator of the present embodiment has the capacitively loaded structure, a bias voltage for driving the modulator needs to be applied through the underlying conductive layer (n-type semiconductor layer), similarly to those disclosed in Non-Patent Literature 2 and Non-Patent Literature 3. If the underlying conductive layer through which the bias voltage is to be applied is a p-type semiconductor layer, a voltage drop would be increased because of its high resistivity. The voltage drop in the case in which the conductive layer is the p-type semiconductor layer is larger by about one digit than in the case of an n-type semiconductor layer. Therefore, the conductive layer through which the bias voltage is to be applied definitely needs to be an n-type semiconductor layer.

Figure 2:
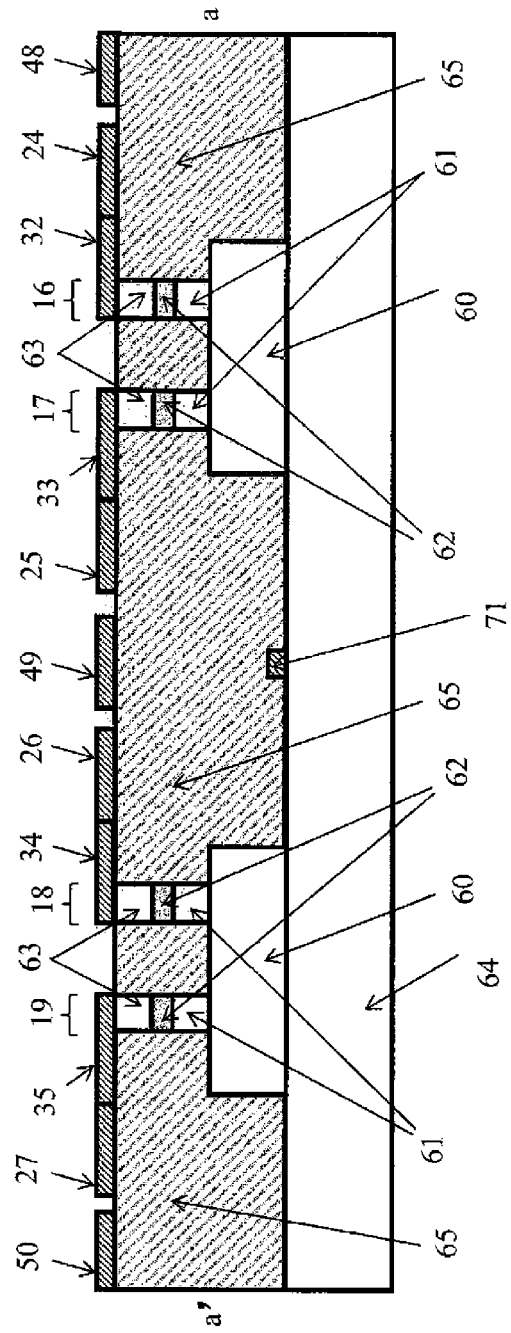
FIG. 2 is a cross-sectional view of a phase modulation portion of the IQ modulator according to the first embodiment of the present invention.

FIG. 2 is a cross-sectional view of the phase modulation portion (the region in which the electrodes 32 to 35 and the phase modulation electrode lines 24 to 27 are present) of the IQ modulator of the present embodiment, and is a cross-sectional view taken along the line a-a' in FIG. 1. The phase modulation portion has a differential capacitively loaded structure in which the electrodes 32 to 35 branched from the phase modulation electrode lines 24 to 27 (main lines) formed on the dielectric layer and having a T-shape as viewed in a plan view are formed on the waveguides 16 to 19, and modulation signals are applied to the waveguides 16 to 19.

The waveguides 16 to 19 in the phase modulation portion are formed from a waveguide structure in which an n-type semiconductor layer (for example, a quaternary layer such as n-InP or n-InGaAsP) 60, a lower cladding layer 61 made of semiconductor, a semiconductor core layer 62, and an upper cladding layer 63 are laminated sequentially on the SI-InP substrate 64.

The input-side lead-out lines 20 to 23, the phase modulation electrode lines 24 to 27, the output-side lead-out lines 28 to 31, and the ground lines 48 to 50 are formed on a dielectric layer 65. In order to reduce losses of the radio frequency lines, the dielectric layer 65 is desirably formed of a low-dielectric material such as, for example, Benzocyclobutene (BCB).

Either one of the upper cladding layer 63 and the lower cladding layer 61 may be an n-type semiconductor, and the other may be a p-type semiconductor. Alternatively, a structure may be adopted in which both the upper cladding layer 63 and the lower cladding layer 61 are n-type semiconductors, and a third p-type cladding layer is inserted between the upper cladding layer 63 and the semiconductor core layer 62 or between the lower cladding layer 61 and the semiconductor core layer 62.

Figure 3:
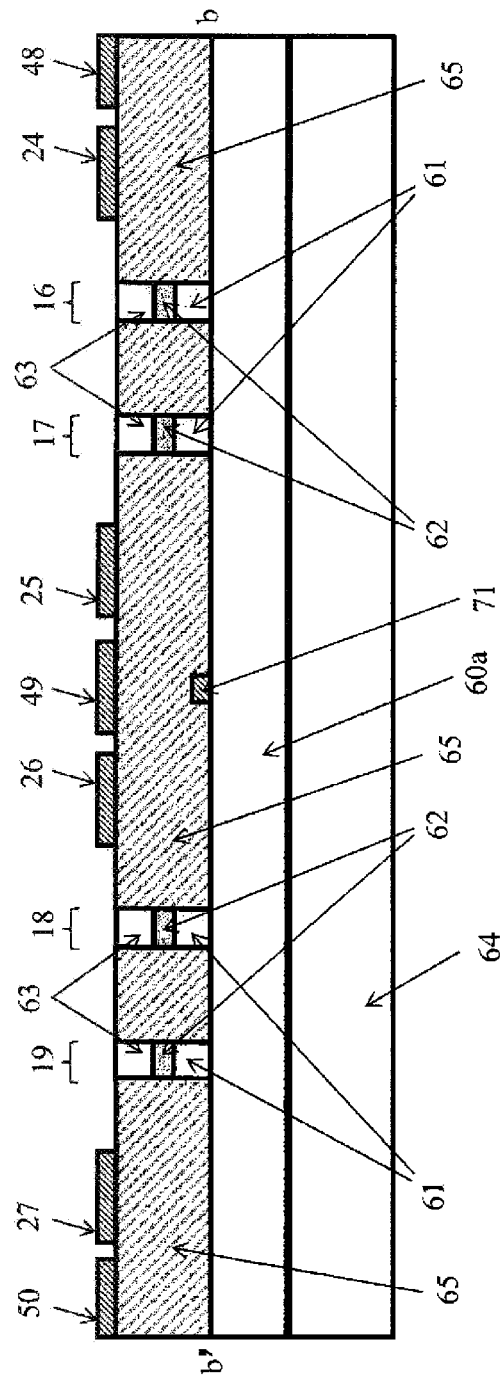
FIG. 3 is a cross-sectional view of the phase modulation portion of the IQ modulator according to the first embodiment of the present invention.
Figure 4:
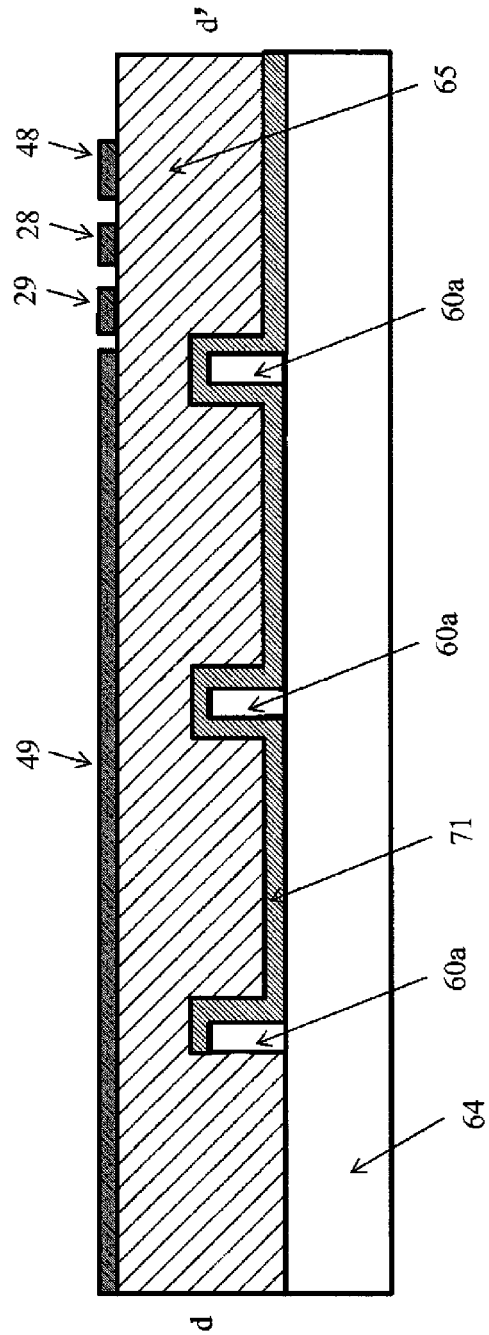
FIG. 4 is a cross-sectional view of a portion of a ground line of the IQ modulator according to the first embodiment of the present invention.

Next, a structure for preventing a voltage to be applied to the n-type semiconductor layer 60 (conductive layer) from dropping will be described. FIG. 3 is a cross-sectional view of the phase modulation portion of the IQ modulator of the present embodiment, and is a cross-sectional view taken along the line b-b' in FIG. 1. FIG. 4 is a cross-sectional view of the portion of the ground line 49 of the IQ modulator of the present embodiment, and is a cross-sectional view taken along the line d-d' in FIG. 1.

In the present embodiment, an n-type semiconductor layer 60a is formed in each of three regions 70 illustrated in FIG. 1. When considering the resistivity, a p-type semiconductor is not preferable for a first wiring layer for applying a voltage to the n-type semiconductor layer 60, and the first wiring layer needs to be formed of an n-type semiconductor or metal. In the present embodiment, the n-type semiconductor layer 60a is formed as the first wiring layer.

In the phase modulation portion, the n-type semiconductor layer 60a is connected to the n-type semiconductor layer 60 in FIG. 2. In the portion of the input-side lead-out lines 20 to 23, the n-type semiconductor layer 60a is connected to the n-type semiconductor layer 60 present only under the waveguides 12, 13. In the portion of the output-side lead-out lines 28 to 31, the n-type semiconductor layer 60a is connected to the n-type semiconductor layer 60 present only under the waveguides 16 to 19.

In order to connect the electrode pad 55 and the n-type semiconductor layer 60a, a wiring layer 71 (second wiring layer) made of metal is formed on the SI-InP substrate 64. The electrode pad 55 and the wiring layer 71 are connected with a via (not shown).

In this manner, in the present embodiment, a voltage can be applied to the n-type semiconductor layer 60 through the wiring layer 71 and the n-type semiconductor layers 60a at least three positions.

Figure 10A:
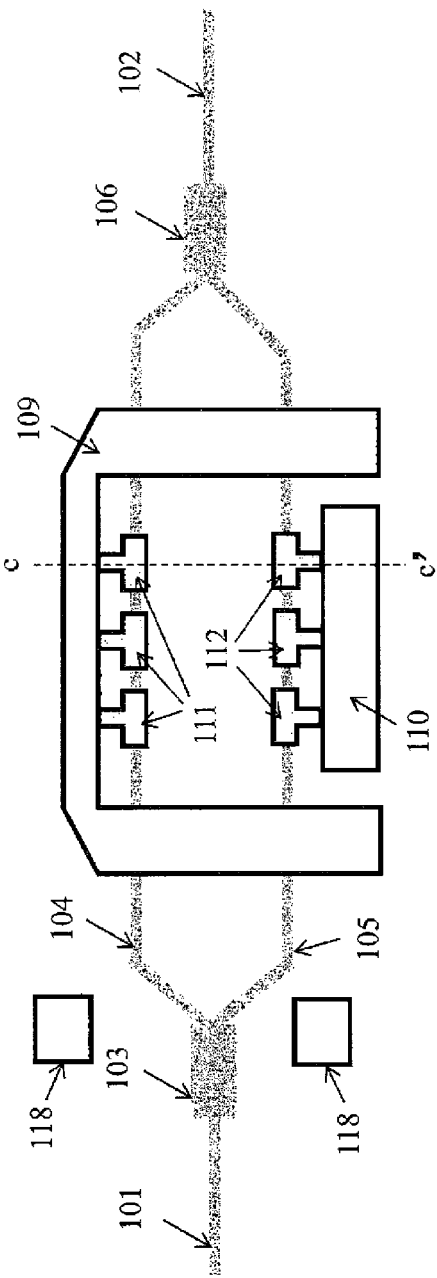
FIG. 10A is a plan view illustrating a configuration of a conventional semiconductor MZ modulator.
Figure 10B:
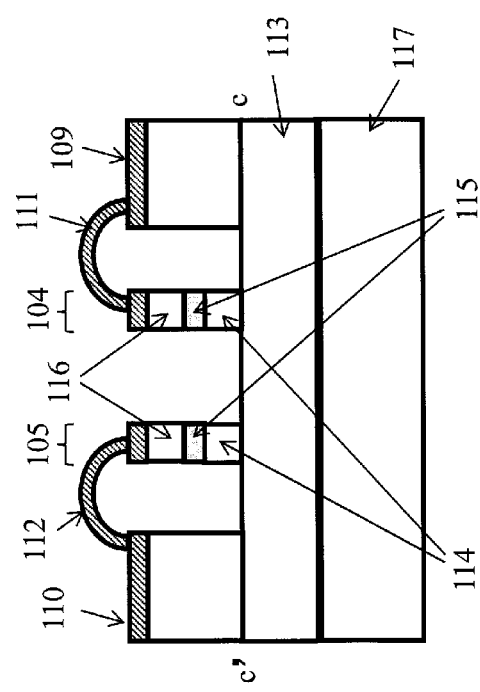
FIG. 10B is a cross-sectional view illustrating the configuration of the conventional semiconductor MZ modulator.

In the conventional structure illustrated in FIG. 10A and FIG. 10B, the electrode pad 118 for applying a voltage to the n-type semiconductor layer under the electrode 111 is provided at one position, and the electrode pad 118 for applying a voltage to the n-type semiconductor layer under the electrode 112 is provided at one position. In this manner, when a voltage is applied to the n-type semiconductor layer only at a position, a voltage drop occurs at a distance from the electrode pad 118, and the voltage becomes smaller than the bias voltage as applied to the electrode pad 118. Thus, a desired phase modulation effect cannot be obtained in the phase modulation portion.

In contrast, in the semiconductor MZ optical modulator of the present embodiment, since a voltage can be applied to the n-type semiconductor layer 60 at a plurality of positions, a drop of the voltage applied to the n-type semiconductor layer 60 is negligible.

For example, in a case in which power of input power of 16 dBm which is a specification of a common modulator module is input, when applying a voltage to the n-type semiconductor layer only at one position as in the structure illustrated in FIG. 10A and FIG. 10B, a bias voltage required to achieve $V\pi=1.5$ V will be larger by about 1 V than in a case in which there is no voltage drop.

In contrast, in the case in which the n-type semiconductor layers 60a are provided at three positions as in the present embodiment, the voltage drop can be reduced to about 0.25 V or below. Since the voltage drop of approximately 0.25 V is substantially equivalent to the amount of change in bias voltage caused by common epitaxial in-plane variation, the influence of the voltage drop is negligible. When the number of the positions of the n-type semiconductor layers 60a are increased to four or five, the amount of the voltage drop can be reduced further.

In addition, when considering the symmetry of the distribution of an applied voltage, it is desirable that the distance from a connection to the n-type semiconductor layer 60 be equal in the adjacent two semiconductor MZ modulators (the semiconductor MZ modulator on the I modulation signal side and the semiconductor MZ modulator on the Q modulation signal side) of the IQ modulator.

On the other hand, in a case of low input power such as 10 dBm, the influence of the voltage drop hardly appears. The reason is because optical power is small, and a light absorbing current from the semiconductor layer has a sufficiently small value. In other words, the drop value of the bias voltage depends on the value of a current flowing into the n-type semiconductor layer 60, and thus also depends on optical input power to a chip.

In addition, it is desirable that the n-type semiconductor layers 60, 60a to which a bias voltage for operating the aforementioned phase modulation portion is applied be made of n-InGaAsP or n-InP having a carrier concentration of more than or equal to $1\times10^{18}$ cm$^{-3}$ in order to reduce the influence of the voltage drop. The n-type semiconductor layers 60, 60a may be formed of a single layer, or two or more layers in which n-InP and n-InGaAsP are combined, for example, and desirably have a thickness of more than or equal to 0.2 μm.

However, the n-type semiconductor layer 60a is basically a conductive layer, and when considering the radio frequency characteristics alone, the presence of the conductive layer around the electrodes 32 to 35 is not desirable. In other words, if the n-type semiconductor layer 60a is provided without any consideration, the RF characteristics will be affected. In order to avoid an influence on the RF characteristics, a voltage is applied to the n-type semiconductor layer at a position that does not affect the phase modulation portion (in a region where the coplanar strip lines 109, 110 and the electrodes 111, 112 are present) in the conventional structure illustrated in FIG. 10A and FIG. 10B. Therefore, a voltage cannot be applied directly to the n-type semiconductor layer around the phase modulation portion.

On the other hand, in the semiconductor MZ optical modulator of the present embodiment, in order to reduce an influence to be exerted upon the radio frequency characteristics, positions of the plurality of regions 70 at which the n-type semiconductor layer 60a is provided are determined as illustrated in FIG. 1. Specifically, the n-type semiconductor layer 60a is provided at positions at which the electrodes 32 to 35 are not present in the overlying layer. Furthermore, in order to ensure the symmetry for an electromagnetic field portion, the n-type semiconductor layer 60a is provided at the central position between the two electrodes adjacent to each other in the extended direction (the lateral direction in FIG. 1) of the waveguides 16 to 19 in the phase modulation portion.

In the present embodiment, the wiring layer 71 is formed at the position of the centerline of the adjacent two semiconductor MZ modulators (the semiconductor MZ modulator on the I modulation signal side and the semiconductor MZ modulator on the Q modulation signal side) of the IQ modulator, and the n-type semiconductor layer 60a is intentionally formed to a region that is unnecessary in terms of applying a voltage to the n-type semiconductor layer 60, that is, a region under the ground lines 48 to 50, so that the distance from the wiring layer 71 to the GSSG configuration (the ground line 49, the phase modulation electrode lines 25, 24, and the ground line 48) of the semiconductor MZ modulator on the I modulation signal side and the distance from the wiring layer 71 to the GSSG configuration (the ground line 49, the phase modulation electrode lines 26, 27, and the ground line 50) of the semiconductor MZ modulator on the Q modulation signal side are equalized.

In other words, the n-type semiconductor layer 60a is formed from a position under the ground line 48 of the semiconductor MZ modulator on the I modulation signal side to a position under the ground line 50 of the semiconductor MZ modulator on the Q modulation signal side, and the distance from the wiring layer 71 to an end close to the semiconductor MZ modulator on the I modulation signal side and the distance from the wiring layer 71 to an end close to the semiconductor MZ modulator on the Q modulation signal side are equal.

In the present embodiment, by providing the n-type semiconductor layer 60a at the central position between the two electrodes adjacent to each other in the extended direction of the waveguides 16 to 19 in the phase modulation portion, the symmetry of the electric field distribution in a differential mode that contributes to the modulation operation can be ensured, and a voltage can be applied to the n-type semiconductor layer 60 through the wiring layer 71 and the n-type semiconductor layer 60a without deteriorating the radio frequency characteristics.

For the adjacent two semiconductor MZ modulators of the IQ modulator, the symmetry is also ensured based on a similar method of thinking by equalizing the distance from the wiring layer 71 to the GSSG configuration of the semiconductor MZ modulator on the I modulation signal side and the distance from the wiring layer 71 to the GSSG configuration of the semiconductor MZ modulator on the Q modulation signal side. Accordingly, for the adjacent two semiconductor MZ modulators, a drop amount of the voltage to be applied to the n-type semiconductor layer 60 can be equalized.

As is understood from FIG. 2 to FIG. 4, in order not to affect the radio frequency lines (the input-side lead-out lines 20 to 23, the phase modulation electrode lines 24 to 27, and the output-side lead-out lines 28 to 31), the wiring layer 71 and the n-type semiconductor layer 60a are entirely implemented by multi-layer wiring, and are arranged below the radio frequency lines.

It is possible to provide the wiring layer 71 and the n-type semiconductor layer 60a above the radio frequency lines, however, a dielectric layer will be provided on the radio frequency lines, and the wiring layer 71 and the n-type semiconductor layer 60a will be provided on the dielectric layer. In this case, it will be structured such that the radio frequency lines are surrounded by a dielectric material, and the radio frequency lines will be decreased in impedance or losses will be increased to affect the radio frequency characteristics. It is therefore not desirable to provide the wiring layer 71 and the n-type semiconductor layer 60a on the radio frequency lines.

In general, a plurality of terminals are difficult to use because of an increased number of wires and an increased number of connection terminals in terms of mounting. Thus, it is desirable to integrate electrode pads of the two semiconductor MZ modulators of the IQ modulator into one. Therefore, in the present embodiment, a single electrode pad 55 is provided in a portion that does not affect the radio frequency lines, and power is supplied from the electrode pad 55 to the n-type semiconductor layer 60a through the wiring layer 71. In addition, for the reason for ensuring the symmetry for the two semiconductor MZ modulators and the reason for avoiding an influence upon radio frequency signals, the wiring layer 71 is arranged under the centerline of the ground line 49 as described above.

Figure 5:
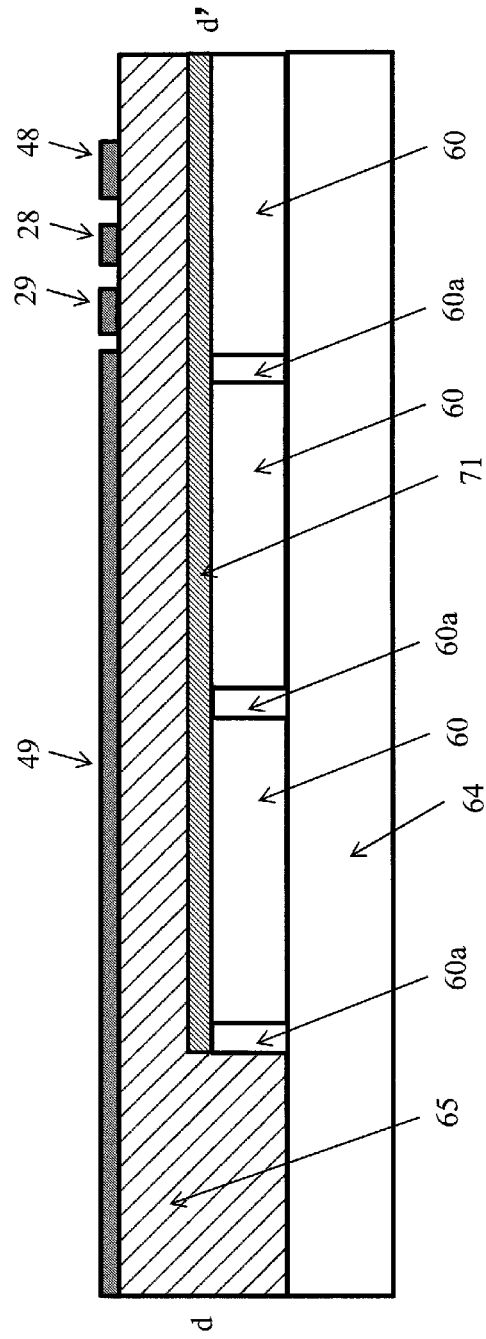
FIG. 5 is another cross-sectional view of the portion of the ground line of the IQ modulator according to the first embodiment of the present invention.

In the present embodiment, description is presented in the example in which the n-type semiconductor layer 60 is present only under the waveguides 10, 12, 13, 16 to 19, 42, 43, and 47 and the MMI couplers 11, 14, 15, 40, 41, and 46, whilst the present embodiment is also applicable to a case in which the n-type semiconductor layer 60 is present in a wider range. FIG. 5 illustrates a cross-sectional view in this case taken along the line d-d' in FIG. 1. However, in order to minimize deterioration of the radio frequency characteristics, it is desirable that the n-type semiconductor layer 60 be absent under the wiring layer 71 as illustrated in FIG. 4.

Second Embodiment

Next, a second embodiment of the present invention will be described. In the first embodiment, the n-type semiconductor layer 60a is formed in the region 70 illustrated in FIG. 1, whilst a metal layer may be formed instead of the n-type semiconductor layer 66a. Also in the present embodiment, the plan view of the IQ modulator is as illustrated in FIG. 1.

Figure 6:
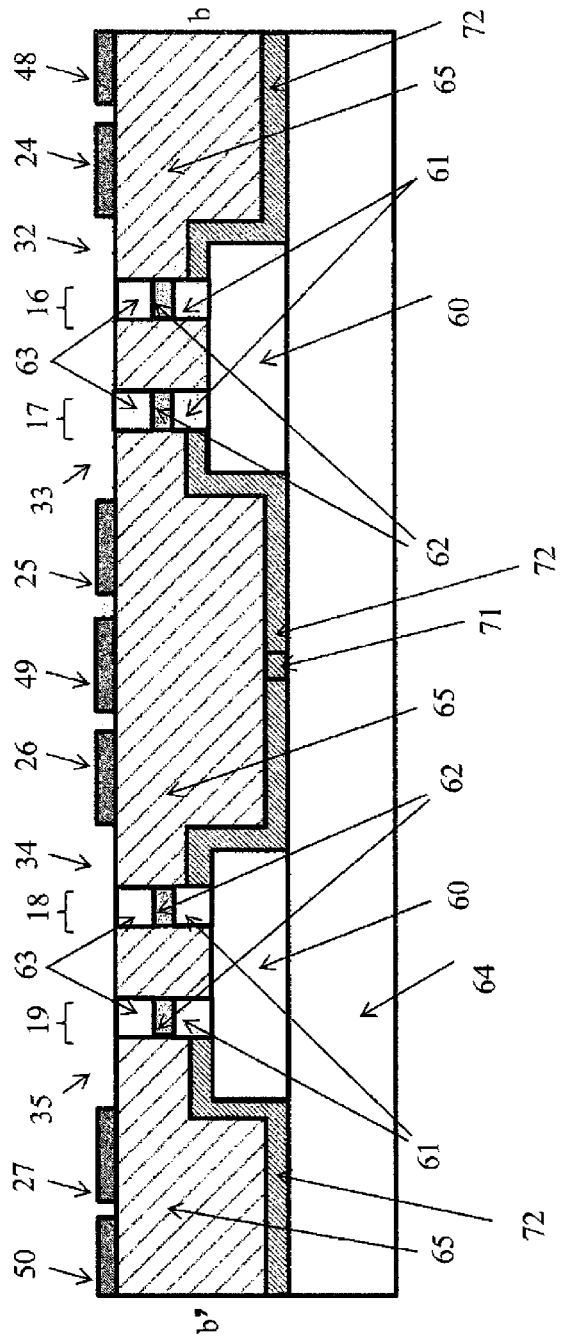
FIG. 6 is a cross-sectional view of a phase modulation portion of an IQ modulator according to a second embodiment of the present invention.

FIG. 6 is a cross-sectional view of a phase modulation portion of the IQ modulator of the present embodiment, and is a cross-sectional view taken along the line b-b' in FIG. 1. A metal layer 72 (first wiring layer) should only be connected to the wiring layer 71 and the n-type semiconductor layer 60, and is arranged intermittently in the present embodiment as illustrated in FIG. 6. That is, the metal layer 72 may be partly discontinuous at portions crossing the waveguides 12, 13, and 16 to 19.

Figure 7:
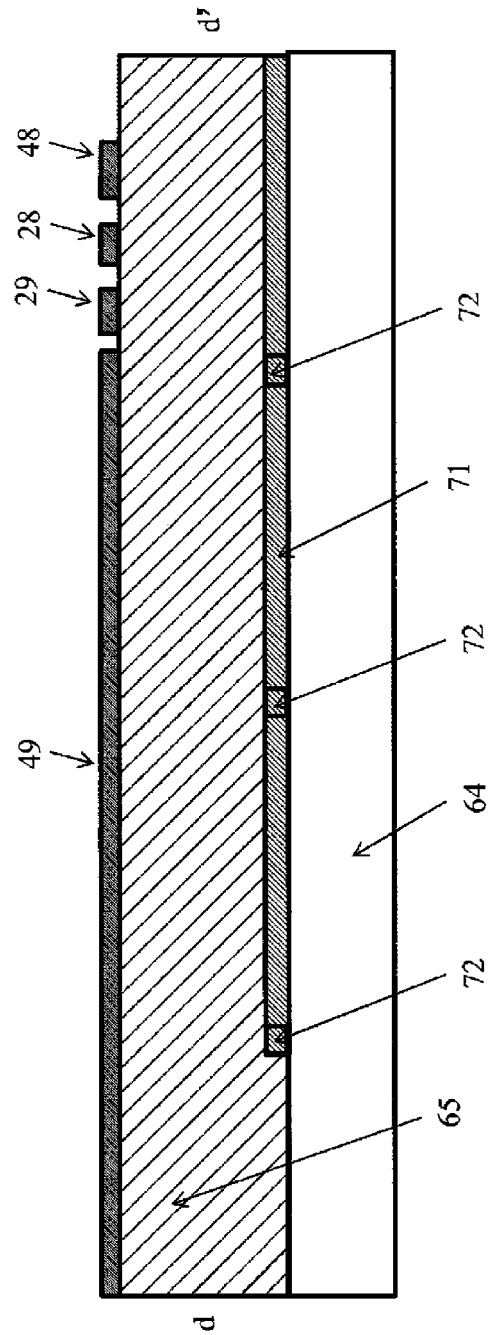
FIG. 7 is a cross-sectional view of a portion of a ground line of the IQ modulator according to the second embodiment of the present invention.

FIG. 7 is a cross-sectional view of the portion of the ground line 49 of the IQ modulator of the present embodiment, and is a cross-sectional view taken along the line d-d' in FIG. 1. Similarly to the n-type semiconductor layer 60a of the first embodiment, the metal layer 72 is connected to the wiring layer 71 at the position under the centerline of the ground line 49.

Third Embodiment

Next, a third embodiment of the present invention will be described. In the first embodiment, the n-type semiconductor layer 60a is formed in the region 70 illustrated in FIG. 1, whilst a metal layer may further be formed on the n-type semiconductor layer 66a. Also in the present embodiment, the plan view of the IQ modulator is as illustrated in FIG. 1.

Figure 8:
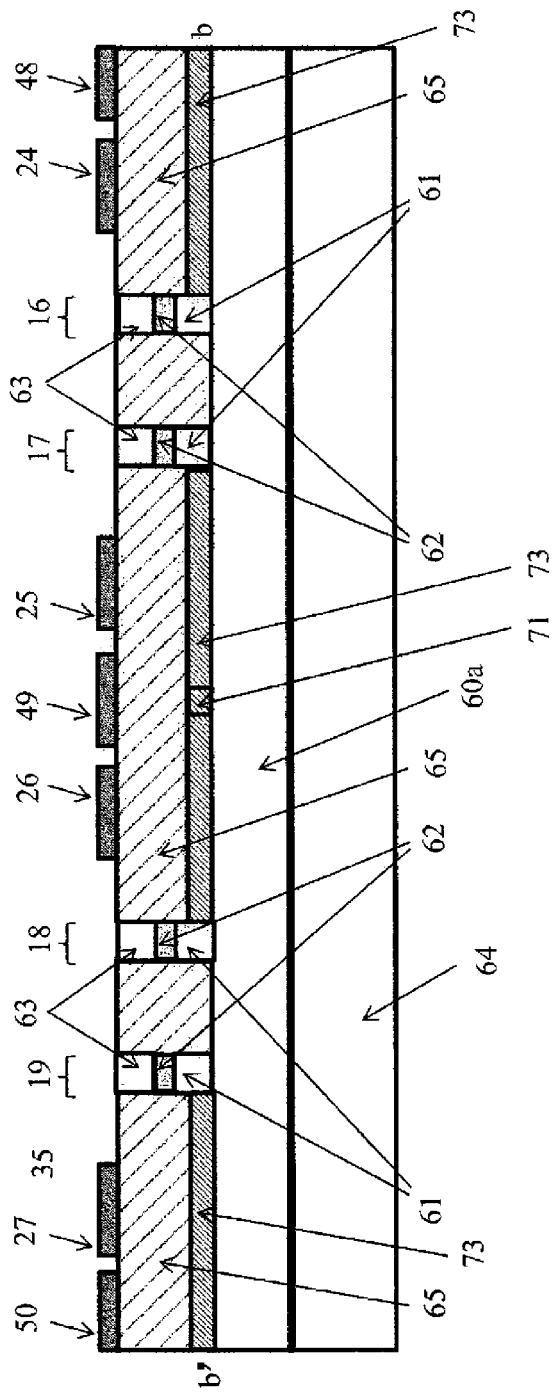
FIG. 8 is a cross-sectional view of a phase modulation portion of an IQ modulator according to a third embodiment of the present invention.

FIG. 8 is a cross-sectional view of a phase modulation portion of an IQ modulator of the present embodiment, and is a cross-sectional view taken along the line b-b' in FIG. 1. The n-type semiconductor layer 60a and a metal layer 73 constitute a second wiring layer. Similarly to the metal layer 72 of the second embodiment, the metal layer 73 is arranged intermittently. That is, the metal layer 73 may be partly discontinuous at portions crossing the waveguides 12, 13, and 16 to 19.

FIG. 9 is a cross-sectional view of the portion of the ground line 49 of the IQ modulator of the present embodiment, and is a cross-sectional view taken along the line d-d' in FIG. 1. Similarly to the n-type semiconductor layer 60a of the first embodiment, the metal layer 73 is connected to the wiring layer 71 at the position under the centerline of the ground line 49.

Note that in the first to third embodiments, the waveguides 16 to 19 of the semiconductor MZ optical modulator have a structure in which the lower cladding layer 61 made of InP, the undoped semiconductor core layer 62, and the upper cladding layer 63 made of InP are laminated sequentially on the SI-InP substrate 64. The same applies to the other waveguides 10, 12, 13, 42, 43, and 47.

The semiconductor core layer 62 functions as an optical waveguide layer, and is made of a material such as InGaAsP or InGaAlAs, for example. The semiconductor core layer 62 may be implemented by a bulk layer or a multi-quantum well layer of quaternary mixed crystal of a single composition. Alternatively, the semiconductor core layer 62 may have a structure in which an optical confinement layer having a band gap larger than that of the multi-quantum well layer and smaller than those of the lower cladding layer 61 and the upper cladding layer 63 is formed over and under the multi-quantum well layer.

The band gap wavelength of the bulk layer or the multi-quantum well layer of quaternary mixed crystal is set such that the electro-optic effect is exerted effectively and light absorption raises no problem at a used optical wavelength. In addition, embodiments of the present invention are not limited to the InP-based material, but a material that matches a GaAs substrate, for example, may be used.

The first to third embodiments have been described with the configuration in which the output-side lead-out lines 28 to 31 are provided, however, the output-side lead-out lines 28 to 31 may not be provided. In the case in which the output-side lead-out lines 28 to 31 are not provided, the output-side ends of the phase modulation electrode lines 24 to 27 will be terminated on the chip.

INDUSTRIAL APPLICABILITY

The embodiments of the present invention are applicable to a semiconductor Mach-Zehnder optical modulator that modulates an optical signal with an electric signal.

REFERENCE SIGNS LIST 10 input waveguide
11, 14, 15 1×2 MMI coupler
12, 13, 16 to 19, 42, 43 waveguide
20 to 23 input-side lead-out line
24 to 27 phase modulation electrode line
28 to 31 output-side lead-out line
32 to 35 electrode
36 to 39, 44, 45 phase adjustment electrode
40, 41, 46 2×1 MMI coupler
47 output waveguide
48 to 50 ground line
51 to 54 termination resistor
55 electrode pad
60, 60a n-type semiconductor layer
61 lower cladding layer
62 semiconductor core layer
63 upper cladding layer
64 SI-InP substrate
65 dielectric layer
71 wiring layer
72, 73 metal layer

The invention claimed is:
1. An IQ modulator comprising:
two semiconductor Mach-Zehnder optical modulators;
an input waveguide on a semi-insulating semiconductor substrate; and
a branching filter on the semi-insulating semiconductor substrate and configured to separate light propogating through the input waveguide into two systems for input to the two semiconductor Mach-Zehnder optical modulators, wherein each of the two semiconductor Mach-Zehnder optical modulators comprises:
an optical waveguide on the semi-insulating semiconductor substrate, the optical waveguide comprising first and second arm waveguides;
a dielectric layer on the semi-insulating semiconductor substrate;
a first input-side lead-out line on the dielectric layer and a second input-side lead-out line on the dielectric layer adjacent to the first input-side lead-out line, the first and second input-side lead-out lines each having a first end and a second end;
first and second phase modulation electrode lines on the dielectric layer along the first and second arm waveguides, the first and second phase modulation electrode lines having first ends respectively connected to the second ends of the first and second input-side lead-out lines;
first and second electrodes respectively configured to apply modulation signals propagating through the first and second phase modulation electrode lines to the first and second arm waveguides, a first modulation signal of the modulation signals being input to the first end of the first input-side lead-out line, and a second modulation signal of the modulation signals that is complementary to the first modulation signal being input to the first end of the second input-side lead-out line;
a conductive layer between the semi-insulating semiconductor substrate and the optical waveguide;
a plurality of first wiring layers disposed intermittently in an extended direction of the optical waveguide so as to cross the optical waveguide, the first wiring layers being connected to the conductive layer;
a second wiring layer connecting the first wiring layers to an electrode pad configured to apply a voltage to the conductive layer;
first and second output-side lead-out lines on the dielectric layer, the first and second output-side lead-out lines having first ends respectively connected to second ends of the first and second phase modulation electrode lines;
a first ground line disposed in the extended direction of the optical waveguide on the dielectric layer outside the first input-side lead-out line, the first phase modulation electrode line, and the first output-side lead-out line; and
a second ground line disposed in the extended direction of the optical waveguide on the dielectric layer outside the second input-side lead-out line, the second phase modulation electrode line, and the second output-side lead-out line;
wherein a first semiconductor Mach-Zehnder optical modulator of the two semiconductor Mach-Zehnder optical modulators configured to receive an I modulation signal as an input and a second semiconductor Mach-Zehnder optical modulator of the two semiconductor Mach-Zehnder optical modulators configured to receive a Q modulation signal as an input are arranged such that the optical waveguides of the first and second semiconductor Mach-Zehnder optical modulators are positioned in parallel to each other;

wherein the second ground line of the first semiconductor Mach-Zehnder optical modulator and the first ground line of the second semiconductor Mach-Zehnder optical modulator adjacent thereto are integral portions of a common ground line common to the two semiconductor Mach-Zehnder optical modulators;

wherein a portion of the second wiring layer arranged in the extended direction of the optical waveguide is arranged under a centerline of the common ground line; and wherein the first wiring layers each extend from a position under the first ground line of the first semiconductor Mach-Zehnder optical modulator to a position under the second ground line of the second semiconductor Mach-Zehnder optical modulator, and a distance from the second wiring layer to an end close to the first semiconductor Mach-Zehnder optical modulator and a distance from the second wiring layer to an end close to the second semiconductor Mach-Zehnder optical modulator are equal.

2. The IQ modulator of claim 1, wherein:
the first wiring layers comprise an n-type semiconductor layer, a first metal, or a structure comprising the first metal on the n-type semiconductor layer, and
the second wiring layer comprises a second metal.

3. The IQ modulator of claim 1, wherein:
the first wiring layers and the second wiring layer are disposed closer to the semi-insulating semiconductor substrate than to the first input-side lead-out line and the first phase modulation electrode line, respectively.

4. The IQ modulator of claim 1, wherein:
the first and second electrodes are disposed periodically in the extended direction of the optical waveguide, and
a first wiring layer of the plurality of first wiring layers is in a region of the first phase modulation electrode line and is arranged at a central position between the first and second electrodes adjacent to each other in the extended direction of the optical waveguide.

5. The IQ modulator of claim 1, wherein a single electrode pad is connected to the first wiring layers of each of the first and second semiconductor Mach-Zehnder optical modulators through the second wiring layer.

6. An IQ modulator comprising:
two semiconductor Mach-Zehnder optical modulators, each of the two semiconductor Mach-Zehnder optical modulators comprising:
an optical waveguide on a semi-insulating semiconductor substrate, the optical waveguide comprising a cladding layer;
a dielectric layer on the semi-insulating semiconductor substrate;
a first input-side lead-out line on the dielectric layer and a second input-side lead-out line on the dielectric layer adjacent to the first input-side lead-out line, the first and second input-side lead-out lines each having a first end and a second end;
first and second phase modulation electrode lines on the dielectric layer along the optical waveguide, the first and second phase modulation electrode lines having first ends respectively connected to the second ends of the first and second input-side lead-out lines;
first and second electrodes respectively connected to the first and second phase modulation electrode lines, the first and second electrodes disposed above the cladding layer of the optical waveguide;
a conductive layer between the semi-insulating semiconductor substrate and the optical waveguide;
a plurality of first wiring layers disposed intermittently in an extended direction of the optical waveguide so as to cross the optical waveguide, the first wiring layers being connected to the conductive layer;
a second wiring layer connecting the first wiring layers to an electrode pad configured to apply a voltage to the conductive layer;
first and second output-side lead-out lines on the dielectric layer, the first and second output-side lead-out lines having first ends respectively connected to second ends of the first and second phase modulation electrode lines;
a first ground line disposed in the extended direction of the optical waveguide on the dielectric layer outside the first input-side lead-out line, the first phase modulation electrode line, and the first output-side lead-out line; and
a second ground line disposed in the extended direction of the optical waveguide on the dielectric layer outside the second input-side lead-out line, the second phase modulation electrode line, and the second output-side lead-out line;
wherein a first semiconductor Mach-Zehnder optical modulator of the two semiconductor Mach-Zehnder optical modulators configured to receive an I modulation signal as an input and a second semiconductor Mach-Zehnder optical modulator of the two semiconductor Mach-Zehnder optical modulators configured to receive a Q modulation signal as an input are arranged such that the optical waveguides of the first and second semiconductor Mach-Zehnder optical modulators are positioned in parallel to each other;
wherein the second ground line of the first semiconductor Mach-Zehnder optical modulator and the first ground line of the second semiconductor Mach-Zehnder optical modulator adjacent thereto are integral portions of a common ground line common to the two semiconductor Mach-Zehnder optical modulators;
wherein a portion of the second wiring layer arranged in the extended direction of the optical waveguide is arranged under a centerline of the common ground line; and
wherein the first wiring layers each extend from a position under the first ground line of the first semiconductor Mach-Zehnder optical modulator to a position under the second ground line of the second semiconductor Mach-Zehnder optical modulator, and a distance from the second wiring layer to an end close to the first semiconductor Mach-Zehnder optical modulator and a distance from the second wiring layer to an end close to the second semiconductor Mach-Zehnder optical modulator are equal.

7. The IQ modulator of claim 6, wherein:
the first wiring layers comprise an n-type semiconductor layer, a first metal, or a structure comprising the first metal on the n-type semiconductor layer, and
the second wiring layer comprises a second metal.

8. The IQ modulator of claim 6, wherein:
the first wiring layers are disposed closer to the semi-insulating semiconductor substrate than to the first input-side lead-out line, and the second wiring layer is disposed closer to the semi-insulating semiconductor substrate than to the first phase modulation electrode line.

9. The IQ modulator of claim 6, wherein:

the first and second electrodes are disposed periodically in the extended direction of the optical waveguide, and a first wiring layer of the plurality of first wiring layers is in a region of the first phase modulation electrode line and is arranged at a central position between the first and second electrodes adjacent to each other in the extended direction of the optical waveguide.

* * * * *